United States Patent
Pappalardo et al.

(10) Patent No.: US 6,505,294 B2
(45) Date of Patent: Jan. 7, 2003

(54) DIRECT CONTROL OF OPERATION BLOCKS USING OPERAND SIGNAL OF CONTROL INSTRUCTION AS EXTENSION TO INSTRUCTION SET IN A HARDWIRED CONTROL PROCESSOR

(75) Inventors: Francesco Pappalardo, Paternò (IT); Davide Tesi, Ferney Voltaire (FR); Francesco Nino Mammoliti, Dasà (IT); Francesco Bombaci, Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/998,568

(22) Filed: Nov. 16, 2001

(65) Prior Publication Data

US 2002/0035679 A1 Mar. 21, 2002

Related U.S. Application Data

(62) Division of application No. 09/221,300, filed on Dec. 23, 1998, now Pat. No. 6,389,528.

(30) Foreign Application Priority Data

Dec. 24, 1997 (EP) .............................................. 97830716

(51) Int. Cl.$^7$ ................................................. G06F 9/30
(52) U.S. Cl. ........................ 712/232; 712/200; 712/208
(58) Field of Search ................................ 712/200, 208, 712/232

(56) References Cited

U.S. PATENT DOCUMENTS 4,631,663 A * 12/1986 Chiliuski et al. ........... 712/229
5,056,008 A * 10/1991 Ono ........................... 712/212
5,440,747 A    8/1995 Kiuchi ........................ 395/375
6,076,156 A    6/2000 Pickett et al. ............... 712/226

FOREIGN PATENT DOCUMENTS

WO    WO 91/11765    8/1991

OTHER PUBLICATIONS

Beraud and Esteban, "Microprocessor operation code expander," *IBM Technical Disclosure Bulletin* 20(12): 5197–5199, May 1978.
"Selecting Predecoded Instructions with a Surrogate," *IBM Technical Disclosure Bulletin* 36(6A): 35–38, Jun. 1993.
Forsell, "Minimal Pipeline Architecture—An Alternative to Superscalar Architecture," *Microprocessors and Microsystems* 20(5): 277–284, Sep. 1996.
Dirac, "Control Word Expansion," *IBM Technical Disclosure Bulletin* 3(7): Dec. 23, 1960.

* cited by examiner

*Primary Examiner*—Kenneth S. Kim
(74) *Attorney, Agent, or Firm*—Lisa K. Jorgenson; Dennis M. de Guzman; Seed IP Law Group PLLC

(57) ABSTRACT

A processor is provided with a set of instructions formed, in general, of an operation section and an operand section. For a special control instruction, the operand section is transmitted to the operation blocks along a bypass path separate from the normal path in which normal instructions are interpreted. In this way, an extension of the set of instructions can be achieved for tailoring the set of instructions to the user's own requirements. Consequently, the processor control unit should be capable of coupling its outputs to its inputs upon receiving one such instruction, thereby to transfer such internal operation control signals without interpretation.

15 Claims, 3 Drawing Sheets

DIRECT CONTROL OF OPERATION BLOCKS USING OPERAND SIGNAL OF CONTROL INSTRUCTION AS EXTENSION TO INSTRUCTION SET IN A HARDWIRED CONTROL PROCESSOR

This is a divisional of application Ser. No. 09/221,300 filed Dec. 23, 1998, now issued U.S. Pat. No. 6,389,528, which claims the benefit of priority from EP application Serial No. 97830716.3 filed Dec. 24, 1997.

BACKGROUND OF THE INVENTION

1. Field of the Invention

This invention relates to computer processors, and more particularly, to a processor that is adaptable according to users preferences.

2. Description of the Related Art

A reference book on processor architectures is, for example, L. Ciminiera and A. Valenzano, "Advanced Microprocessor Architectures", Addison-Wesley, 1987, wherein both traditional and advanced architectures, such as CISC (Complex Instruction Set) and RISC (Reduced Instruction Set) configurations, are illustrated.

In fact, to enhance the calculating capabilities of processors, there are two opposite courses that can be followed: a first course consists of providing the processors with plural complex instructions (CISC), quite powerful but slow to execute, and the second consists of providing the processors with few simple instructions (RISC), less powerful but quickly executed.

An obvious solution is that of making each instruction the most convenient compromise (of instruction complexity versus speed of execution) for the user of the processor. However, this cannot be carried into effect exhaustively, and in consequence, different processors are offered on the market for different types of applications.

SUMMARY OF THE INVENTION

An embodiment of this invention solves the problem outlined above by providing a processor with a set of instructions which can be easily expanded and/or customized by the user.

The processor of the embodiment is provided with at least one control instruction wherein the operand section represents control signals for controlling the processor operation; in this way, an extension of the set of instructions can be simulated.

Accordingly, the control unit of the processor of the embodiment is capable of coupling its outputs to its inputs, upon receiving an instruction as above, so as to transfer such internal operation control signals without any interpretation.

According to another aspect, another embodiment of the invention is directed to an integrated circuit and a processing system in which the processor can be advantageously included.

DETAILED DESCRIPTION

Figures 1, 2:
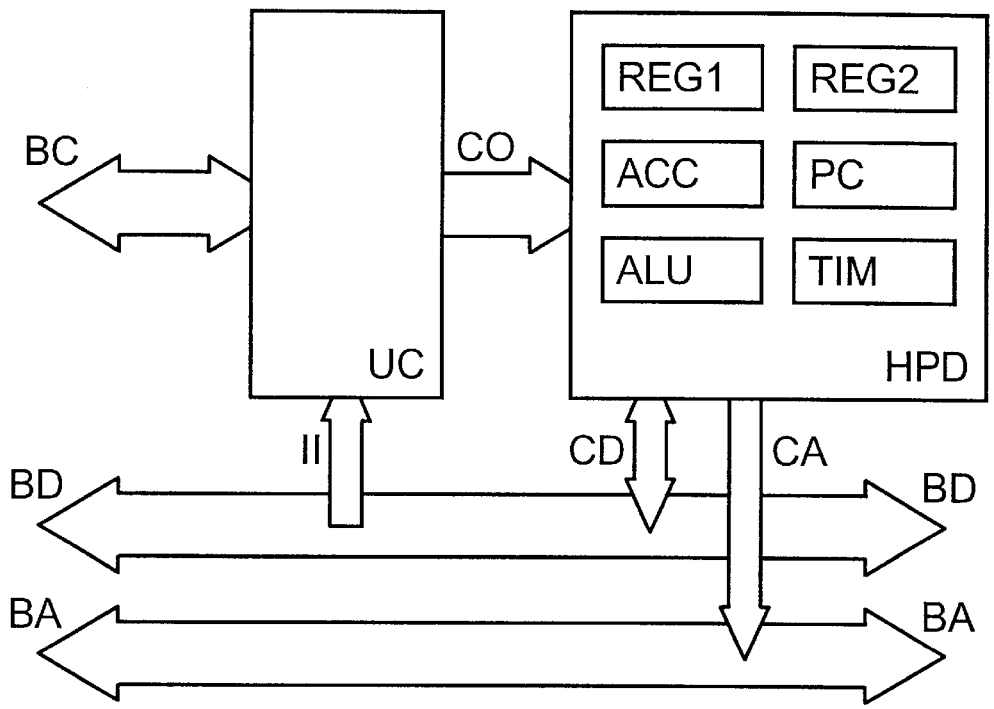
FIG. 1 shows schematically a block diagram of a prior art processor.
FIG. 2 is a partial diagram of a set of instructions in a processor according to the invention.

Considering the example of FIG. 1, a prior art processor comprises a plurality HPD of operating blocks which have operation control inputs CO, current address outputs CA and current data inputs/outputs CD, and a control unit UC having instruction inputs II and control outputs CO connected to said control inputs CO; provided within the processor are a control bus BC, a data bus BD, and an address bus BA, in general all bi-directional. These internal buses are connected to corresponding external buses, with the control bus BC being connected to the control unit UC, the data bus BD connected to the instruction inputs II and the current data I/O's CD, and the address bus BA connected to the current address outputs CA.

The plurality HPD of operating blocks include, for example, an accumulator register ACC, a program count register PC, a few working registers (of which two, REG1 and REG2, are shown), an arithmetic and logic calculating unit ALU, and a timing unit TIM. These operating blocks are each provided with one or more operation control inputs (collectively designated CO), and connected to the data I/O's CD and/or the address outputs CA according to the operations that they are to perform.

The basic duty of the control unit UC is to interpret instructions received on its inputs II, and consequently generate, on its outputs CO, suitable internal operation control signals for the operating blocks. The duty of the control bus BC and the meaning conveyed by the external control signals being propagated therethrough will be no further discussed herein because foreign to this invention and well known from literature.

Referring to FIG. 2, the set of instructions of the processor in FIG. 1 may include, for example, the instructions ADD, LOAD, INC-ACC, JMP-REL, JMP-ABS, and many more. These instructions are formed of an operation section S1 of fixed length—e.g., 1 byte (8 bits) of an operational code OPC—and an operand section S2 of varying length—e.g., 1, 2, 3 data DAT or address ADR bytes, or bytes of a generic operand OP—excepting the instruction INC-ACC which requires no operand, as explained hereinafter.

The instructions convey the following meanings:

ADD—add together the contents of the register corresponding to the first operand OP1 and the contents of the register corresponding to the second operand OP2, and place the result into the accumulator register;

LOAD—load the memory contents identified by the corresponding address to the operand ADR, into the accumulator register;

INC-ACC—increase the contents of the accumulator register;

JMP-REL—jump to executing the instruction included in the memory word identified by the address being the sum of the program count register PC contents and the operand DAT;

JMP-ABS—jump to executing the instruction included in the memory word identified by the corresponding address to the operand ADR.

In the processor of this invention, there is at least one instruction, designated CNTR in FIG. 2 and being formed of an operation section S1 and an operand section S2, wherein the operand section, corresponding to 7 bytes in FIG. 2, represents internal (and external, if any) operation control signals of the processor.

With the instruction CNTR, any new operation can be performed (as allowed by the operating blocks and the connections inside the plurality HPD), using as the operand data corresponding to values of the control signals which would implement that new operation. For example, using an instruction CNTR, the registers REG1 and REG2 can be loaded simultaneously from the memory. The step of acquiring an instruction CNTR would obviously take longer than the steps for the other instructions (in the example of FIG. 2, 6 bytes must be acquired instead of 4 bytes at most), but is compensated by the almost complete absence of instruction interpreting activity.

In this way, each user is enabled to add specific instructions to the standard set of instructions, as the user's particular application may require.

This extension is achieved neither at the expense of the efficiency of standard instruction execution, nor of circuit complexity of the processor instruction interpreter.

Of the various viable courses, the simplest implemented is one where the operand section would represent all the (typically) internal processor operation control signals.

In this case, if the control of the program execution flow is to be taken away from the programmer, then it is more convenient to have the operand section represent all the internal control signals of the processor operation, but for control signals to the program count register PC; the register PC would then be managed conventionally by the control unit UC.

Figure 3:
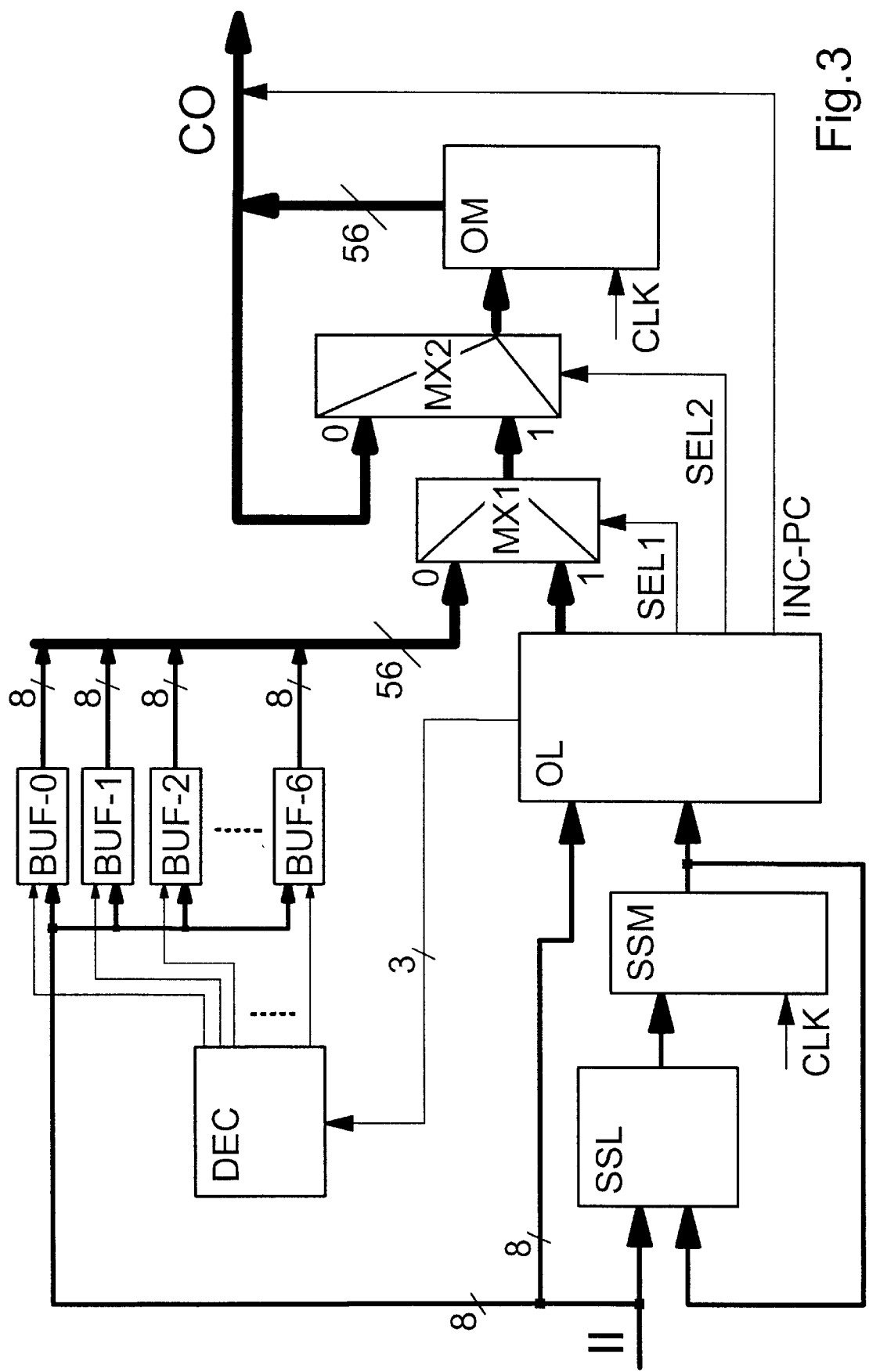
FIG. 3 is a block diagram of a control unit in a processor according to the invention.

Alternatively, a number of instructions may be provided whose respective operand sections represent discrete sets of (typically) internal processor operation control signals; thus, the lengths of the control instructions can be greatly reduced. These sets may be separate or partly cross one another Referring to FIG. 3, the control unit UC may be a finite state machine in an otherwise conventional processor, and may include proximate state logic circuitry SSL having first inputs connected to the inputs II of the unit UC, a state memory SSM having inputs connected to the outputs of the circuitry SSL and outputs connected to second inputs of the circuitry SSL, as well as output logic circuitry OL having first inputs connected to the inputs II of the unit UC and second inputs connected to the outputs of the memory SSM; the memory SSM also has an input CLK for a clock signal. The outputs of the circuitry OL may either be connected to the outputs CO of the unit UC directly, or through a latching arrangement as shown in FIG. 3. The latching arrangement comprises a multiplexer MUX2 having first inputs coupled to the outputs of the circuitry OL and having a selection input SEL2 connected to a particular output of the circuitry OL, an output memory OM having inputs connected to the outputs of the multiplexer MUX2 and outputs connected to both the outputs CO and to the second inputs of the multiplexer MUX2. The memory OM also has an input CLK for a clock signal.

Alternatively, the control unit could be microprogrammed.

In the processor of this invention, a circuit section (DEC, BUF-0. . . BUF-6, MUX1) is added in the control unit UC for coupling the outputs CO to the inputs II such that information can be transferred from the inputs to the outputs.

Since, in general, the number of outputs CO—56 in the example of FIG. 3—would be much larger than the number of inputs II—8 in the example of FIG. 3—it may be arranged for the control unit UC to include buffer logic circuitry BUF-0. . . BUF-6. The coupling of the inputs II and outputs CO may then be established through this circuitry such that the transferal of information from the inputs II to the circuitry BUF will take place at successive time phases, and the transferal of information from the circuitry BUF to the outputs CO at one time phase.

In order to reduce the length of the control instructions CNTR, it could be conceived of encoding the control signals. For example, if the calculating unit ALU can effect eight different arithmetic and logic operations, and has eight corresponding operation control inputs available, three bits encoded in the instruction CNTR would be sufficient. In this case, the control unit UC would require decoding logic circuitry (omitted from the example in FIG. 3), and the inputs II and outputs CO would be coupled through this circuitry.

Of course, the control unit UC must be capable of discriminating between the control instruction CNTR and the other instructions. For that purpose, it includes an instruction interpreter (SSL, SSM, OL) arranged to interpret a set of instructions of which at least one is formed of an operation section and an operand section, the operand section representing values of operation control signals.

In the embodiment of FIG. 3, the 8 inputs II are connected in parallel to 7 buffers BUF-0, BUF-1, BUF-2, BUF-3, BUF-5, BUF-6; the outputs of the buffers BUF are connected to 56 first inputs of a multiplexer MUX1; 56 second inputs of the multiplexer MUX1 are connected to the outputs of the circuitry OL, and one selection input SEL1 of this multiplexer is connected to a particular output of the circuitry OL; the outputs of the multiplexer MUX1 are connected to the first inputs of the multiplexer MUX2; the buffers BUF also have inputs CLK (omitted from FIG. 3 for simplicity) for a clock signal, and activation inputs respectively connected to a decoder DEC. The decoder DEC has three inputs connected to particular outputs of the circuitry OL, and eight outputs, of which one is not used and is omitted from FIG. 3. It should be noted that the circuitry OL is provided with a particular separate output for the increase control signal INC-PC to the program count register PC.

Figure 4:
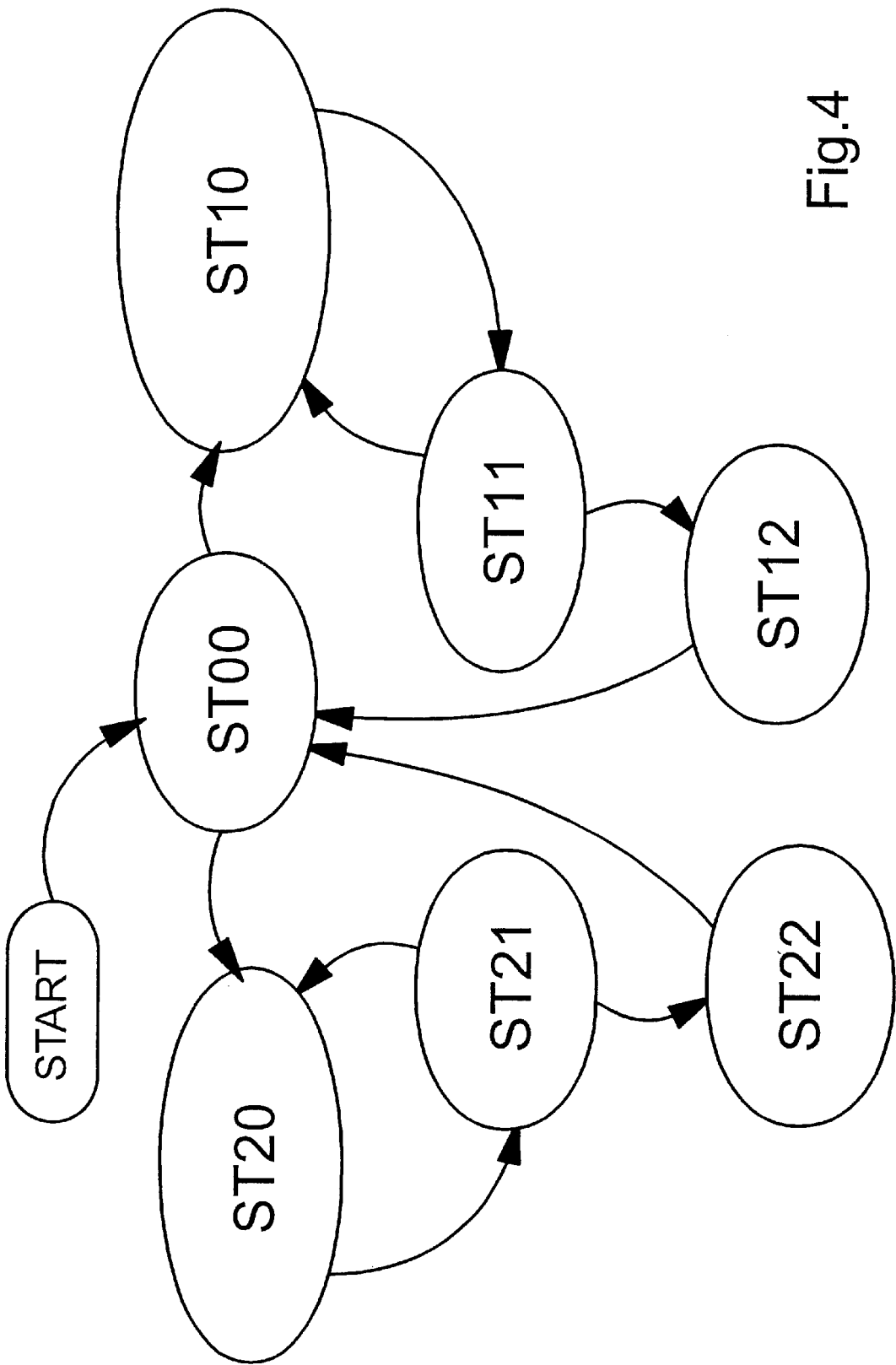
FIG. 4 shows schematically a state transition diagram of the control unit in FIG. 3.

The operation of the control unit UC is more clearly explained with the aid of the state transition diagram of FIG. 4.

At startup, the unit is in the state ST10.

Upon receiving an instruction CNTR, the unit goes over to the state ST10, SEL1 is set to "0", SEL2 is set to "0", DEC is set to "000", and INC-PC is set active; the memory is now addressed.

Upon a clock pulse, the unit goes over to the state ST11, SEL1 and SEL2 and DEC remain stable, and INC-PC is set inactive; the first byte is now stored into the buffer BUF-0.

Upon a clock pulse, the unit goes over to the state ST10, SEL1 is set to "0", SEL2 is set to "0", DEC is set to "001", and INC-PC is set active; the memory is now addressed.

The states ST10 and ST11 are reiterated until all the buffers BUF are loaded with data; thereafter, the unit will go over to the state ST12, SEL1 will be set to "0", SEL2 set to "1", and INC-PC set active; the control signals are now supplied to the outputs CO and preparations are made for acquiring the next instruction from the memory.

Upon a clock pulse, the unit is restored to its initial state ST00, SEL2 is set to "0", and INC-PC is set inactive; the operating code OPC of the instruction, as just acquired, is then decoded.

Upon a clock pulse, and dependent on the result of the decoding operation, the unit goes over to either the state ST10 or the state ST20.

When an ordinary instruction is received, the unit goes over to the state ST20, SEL1 is set to "1", SEL2 is set to "0", and INC-PC is set active; the memory is now addressed.

Upon a clock pulse, the unit goes over to the state ST21, SEL1 and SEL2 remain stable, and INC-PC is set inactive; the first byte of the operand is presently acquired.

Upon a clock pulse, the unit goes over to the state ST20, SEL1 is set to "1", SEL2 is set to "0", and INC-PC is set active; the memory is presently addressed.

The states ST20 and ST21 are iterated until the instruction is fully acquired; subsequently to this, the unit will go over to the state ST22, SEL1 will be set to "1", SEL2 set to "1", and INC-PC set active; thus, the control signals are supplied to the outputs CO, and preparations are made for acquiring the next instruction from the memory.

Upon a clock pulse, the unit is restored to its initial state ST00, SEL2 is set to "0", and INC-PC is set inactive; the operating code OPC of the instruction just acquired is then decoded.

The above repeats itself throughout the processor operation.

It will be appreciated that this processor may be connected to advantage in a semiconductor integrated circuit, or in a single- or multi-processor type of processing system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. In a hardwired control processor architecture, a method of executing instructions from a predetermined set of instructions of which at least one is formed of an operation section and an operand section, wherein the set includes a control instruction having an operand section that includes control signals that are executable by an operating unit, the method comprising:

receiving instructions of the predetermined set;

determining whether the received instructions includes the control instruction;

and, upon receiving one of the instructions other than the control instruction, converting the instruction to a control signal, transferring the control signal to an operating block, and executing the control signal using the operating block; and upon receiving the control instruction, transferring the operand section of the control instruction to the operating block, and directly executing the control signals included with the operand section using the operating block.

2. The method of claim 1 wherein the method is performed using a processor that includes first and second paths between an instruction input and control outputs connected to the operating block, wherein the control signal is transferred to the operating block through the first path and the operand section of the control instruction is transferred to the operating block through the second path.

3. The method of claim 2 wherein the first path includes an instruction interpreter that receives the control instruction and the one of the instructions other than the control instruction and causes the instructions to be transferred along their respective paths to the operating block.

4. The method of claim 3 wherein the first and second paths are connected between the instruction input and a switch unit that is coupled to the control outputs for selectively connecting one of the paths to the control outputs, wherein the instruction interpreter controls which of the paths is connected to the control output by the switch unit.

5. The method of claim 4 wherein the operand section of the control instruction is input to the second path in successive time phases and is transferred to the switch unit in a single time phase.

6. The method of claim 5 wherein instruction interpreter controls buffer logic circuitry to input the operand section of the control instruction in successive time phases and transfer the operand section to the switch unit in a single time phase.

7. The method of claim 1, wherein the control instruction is one of a plurality of control instructions whose respective operand sections represent distinct sets of internal control signals of a processor that performs the method.

8. A method of instruction processing for a hardwired control processor arranged to execute instructions from a predetermined set of instructions of which at least one is formed of an operation section and an operand section, wherein the set includes a control instruction having an operand section that includes operation control signals for controlling operation of the processor, the method comprising:

receiving a computer instruction having an operation code;

determining whether the operation code indicates an instruction from among a primary set of instructions or is a control code of the control instruction;

if the operation code indicates an instruction, then executing the instruction indicated;

if the operation code is the control code of the control instruction, then obtaining from the operand section of the control instruction the operating control signals of the control instruction, and directly executing the operation control signals obtained from the operand section of the control instruction.

9. The method of claim 8 wherein the determining act includes determining whether the operation code is a first control code having an operand section that includes operation control signals from among a first set of operation control signals or a second control codehaving an operand section that includes operation control signals from among a second set of operation control signals, and the method further includes executing operation control signals of the first set if the operation code is the first control code and executing operation control signals of the second set if the operation code is the second control code.

10. The method of claim 8 wherein the method is executed by the processor having a control unit and an operating block, the method further comprising sending the operand section of the control instruction from the control unit to the operating block, the operand itself being an internal control signal.

11. The method of claim 8 wherein the method is executed by the processor having a control unit and an operating block, the method further comprising decoding the indicated instruction into operational control signals that are passed to the operating block, which performs a computer operation based on the operation control signals.

12. The method of claim 8 wherein the method is executed by the processor having a control unit and an operating block, the method further comprising transferring the operand section of the control instruction into plural buffers of the control unit in successive time phases and transferring the operand section of the control instruction from the plural buffers to the operating block in a single time phase.

13. The method of claim 8 wherein the method is executed by a processor having a control unit with an input for receiving instructions and an output, the method further comprising coupling the input to the output in response to determining that the operation code is the control code.

14. A method of executing instructions from a predetermined set of instructions of which at least one is formed of an operation section and an operand section, wherein the set includes a control instruction having an operand section that includes control signals that are executable by an operating unit, the method comprising:

receiving instructions of the predetermined set;

determining whether the received instructions includes the control instruction;

and, upon receiving one of the instructions other than the control instruction, converting the instruction to a control signal, transferring the control signal to an operating block, and executing the control signal using the operating block;

and, upon receiving the control instruction, transferring the operand section of the control instruction to the operating block, and executing the operand section using the operating block;

wherein the method is performed using a processor that includes first and second paths between an instruction input and control outputs connected to the operating block, wherein the control signal is transferred to the operating block through the first path and the operand section of the control instruction is transferred to the operating block through the second path;

wherein the first path includes an instruction interpreter that receives the control instruction and the one of the instructions other than the control instruction and causes the instructions to be transferred along their respective paths to the operating block;

wherein the first and second paths are connected between the instruction input and a switch unit that is coupled to the control outputs for selectively connecting one of the paths to the control outputs, wherein the instruction interpreter controls which of the paths is connected to the control output by the switch unit; and wherein the operand section of the control instruction is input to the second path in successive time phases and is transferred to the switch unit in a single time phase.

15. The method of claim 14 wherein instruction interpreter controls buffer logic circuitry to input the operand section of the control instruction in successive time phases and transfer the operand section to the switch unit in a single time phase.

* * * * *